United States Patent
Nakama

(10) Patent No.: US 11,268,939 B2
(45) Date of Patent: Mar. 8, 2022

(54) THERMAL CONDUCTIVITY DETECTOR AND GAS CHROMATOGRAPH EQUIPPED WITH THE SAME

(71) Applicant: Shimadzu Corporation, Kyoto (JP)

(72) Inventor: Yuji Nakama, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 101 days.

(21) Appl. No.: 16/560,099

(22) Filed: Sep. 4, 2019

(65) Prior Publication Data
US 2020/0088697 A1 Mar. 19, 2020

(30) Foreign Application Priority Data

Sep. 13, 2018 (JP) .............................. JP2018-171858

(51) Int. Cl.
*G01N 30/66* (2006.01)
*G01N 30/02* (2006.01)

(52) U.S. Cl.
CPC ....... *G01N 30/66* (2013.01); *G01N 2030/025* (2013.01)

(58) Field of Classification Search
CPC .. G01N 30/66; G01N 2030/025; G01N 20/02; G01N 30/20; G01N 30/30; G01N 2030/3053
See application file for complete search history.

(56) References Cited

U.S. PATENT DOCUMENTS

| 4,095,462 A * | 6/1978 | Goto | G01M 15/104 |
|---|---|---|---|
| | | | 73/114.72 |
| 7,185,527 B2 | 3/2007 | Lin | |
| 2010/0171055 A1* | 7/2010 | Dourdeville | B23K 20/24 |
| | | | 251/129.11 |
| 2016/0103105 A1* | 4/2016 | Nakama | G01N 25/18 |
| | | | 73/23.4 |

FOREIGN PATENT DOCUMENTS

| CN | 101652319 A | 2/2010 |
|---|---|---|
| CN | 105510493 A | 4/2016 |
| JP | 07-43356 A | 2/1995 |

OTHER PUBLICATIONS

Office Action dated Oct. 15, 2021 issued in the counterpart Chinese patent application (201910864087.X) and English machine translation thereof.
Office Action dated Jan. 11, 2022 and issued in the counterpart Japanese patent application JP2018-171858 and English machine translation thereof.

\* cited by examiner

*Primary Examiner* — Herbert K Roberts
*Assistant Examiner* — John M Royston
(74) *Attorney, Agent, or Firm* — Muir Patent Law, PLLC

(57) ABSTRACT

A thermal conductivity detector includes a first pipe passage and an exhaust pipe passage. The first pipe passage is accommodated in a cell block together with a heating device. The exhaust pipe passage has an outlet port at the downstream end, and most of the exhaust pipe passage (Continued)

including the downstream end is drawn out of the cell block. The heating device maintains the space in the cell block at a temperature capable of vaporizing the sample. A filament is accommodated in the first pipe passage. The gas passing through the first pipe passage is discharged out of the thermal conductivity detector through the exhaust pipe passage outlet port. On the inner surface of the exhaust pipe passage, a coating having resistance to a cleaning fluid for removing the adhered substance due to the sample gas is formed.

7 Claims, 3 Drawing Sheets

THERMAL CONDUCTIVITY DETECTOR AND GAS CHROMATOGRAPH EQUIPPED WITH THE SAME

BACKGROUND OF THE INVENTION

Field of the Invention

The present invention relates to a thermal conductivity detector for a gas chromatograph and a gas chromatograph equipped with the same.

Description of the Related Art

In a gas chromatograph, for example, a thermal conductivity detector is used to analyze a sample. The thermal conductivity detector described in U.S. Pat. No. 7,185,527 specification is provided with one cavity in which a filament is arranged. In a state in which the filament is heated to a constant temperature, a sample gas and a reference gas are alternately introduced into the cavity.

At this time, the heat of the filament is drawn according to the thermal conduction of the introduced gas, which causes a change in the resistance value of the filament. Therefore, the thermal conductivity of the sample gas can be measured by measuring how much the resistance value of the filament when the sample gas flows through the cavity has changed from the resistance value of the filament when the reference gas flows through the cavity.

The sample gas and the reference gas that have passed through the cavity are discharged to the outside of the thermal conductivity detector through a pipe connected to the cavity.

SUMMARY OF THE INVENTION

As described above, the thermal conductivity detector is provided with a pipe (hereinafter referred to as an "exhaust pipe") for discharging a sample gas introduced into a flow path in which a filament is arranged to an outside of the thermal conductivity detector.

In a gas chromatograph, when the exhaust pipe of the thermal conductivity detector is clogged, it is necessary to replace the thermal conductivity detector with a new thermal conductivity detector. However, a thermal conductivity detector is expensive. For this reason, it is difficult to reduce a running cost of a gas chromatograph.

An object of the present invention is to provide a thermal conductivity detector capable of reducing a running cost of a gas chromatograph and a gas chromatograph equipped with the same.

As described above, it has been conventionally known that clogging occurs in an exhaust pipe of a thermal conductivity detector in a gas chromatograph. It has been recognized, however, that clogging in the exhaust pipe indicates the time for replacing the thermal conductivity detector. Therefore, the mechanism of clogging of an exhaust pipe in a thermal conductivity detector has not been figured out at all and has not been paid attention thereto. On the other hand, the present inventor examined the mechanism that an exhaust pipe is clogged while developing a thermal conductivity detector, and obtained the following examination results.

A relatively high temperature sample gas generated by vaporizing a sample is introduced into a thermal conductivity detector of a gas chromatograph, and the thermal conductivity of the sample gas is detected. On the other hand, in a thermal conductivity detector, most of the exhaust pipe is usually located in the atmosphere. Therefore, it is considered that the occurrence of clogging in the exhaust pipe is caused by condensation or solidification of the vaporized high temperature sample gas in the exhaust pipe.

According to the above examination result, if it is possible to clean the inside of the exhaust pipe in order to remove the condensate and the coagulate of the sample gas, that is, the substance adhered to the inner surface of the exhaust pipe (hereinafter referred to as "adhered substance"), it is not necessary to replace the thermal conductivity detector each time clogging of the exhaust pipe occurs. However, in this case, depending on the cleaning fluid used to remove the adhered substance, the inner surface of the exhaust pipe may be corroded by the cleaning.

Therefore, the inventor further studied the continuous utilization of the thermal conductivity detector by removing clogging of the exhaust pipe together with the problem, and devised the invention described below.

(1) A thermal conductivity detector according to one aspect of the present invention is a thermal conductivity detector for a gas chromatograph, includes:

a flow path having a first portion and a second portion arranged on a downstream of the first portion, the flow path being configured to guide a sample gas to an outlet port of the second portion through the first portion and the second portion;

a heating element accommodated in the first portion to detect thermal conductivity of the sample gas; and a heat retention unit configured to keep the first portion warm, wherein a first coating having resistance to a cleaning fluid for removing an adhered substance due to the sample gas is formed on an inner surface of the second portion of the flow path.

The first portion of the flow path is kept warm by the heat retention unit. As a result, the temperature drop of the sample gas is reduced, so that there occurs no adhered substance caused by the sample gas inside the first portion. On the other hand, since the second portion is not kept warm by the heat retention unit, there is a possibility that there occurs an adhered substance.

Even in such a case, by supplying a cleaning fluid to the second portion of the flow path, the adhered substance generated in the second portion can be dissolved and removed from the second portion. At this time, since the first coating is formed on the inner surface of the second portion, corrosion of the inner surface by the cleaning fluid is suppressed. Thereby, the thermal conductivity detector after cleaning can be reused. Therefore, the replacement of the thermal conductivity detector in the gas chromatograph becomes unnecessary, which enables reduction of the running cost of the gas chromatograph.

(2) The first coating may also be formed on an inner surface of the first portion.

In this case, even if the cleaning fluid flows in the first portion during the cleaning of the second portion, corrosion of the inner surface of the first portion by the cleaning fluid is suppressed. The first coating also functions as a protective film on the inner surface of the flow path. Thereby, the life extension of the thermal conductivity detector can be realized.

(3) The first coating may have higher resistance to the cleaning fluid than a material forming the flow path.

In this case, corrosion of the inner surface of the second portion by the cleaning fluid is sufficiently suppressed.

(4) The heating element may be provided with a second coating having resistance to the cleaning fluid.

In this case, even if the cleaning fluid flows in the first portion, corrosion of the heating element in the first portion by the cleaning fluid is suppressed. Further, the second coating also functions as a protective film of the heating element. Thereby, the life extension of the thermal conductivity detector can be realized.

(5) The second coating may have higher resistance to the cleaning fluid than a material forming the heating element.

In this case, corrosion of the heating element by the cleaning fluid is sufficiently suppressed.

(6) A gas chromatograph according to another aspect of the present invention is a gas chromatograph including:

a sample vaporization unit configured to generate a sample gas by vaporizing a sample;

a column configured to separate components of the sample gas generated by the sample vaporization unit; and the above-described thermal conductivity detector, wherein the thermal conductivity detector detects thermal conductivity of the sample gas of each component separated by the column.

The gas chromatograph is provided with the thermal conductivity detector described above. Therefore, it is possible to reduce the running cost.

DESCRIPTION OF PREFERRED EMBODIMENTS

Hereinafter, a thermal conductivity detector according to an embodiment of the present invention and a gas chromatograph equipped with the same will be described with reference to the drawings.

Figure 1:
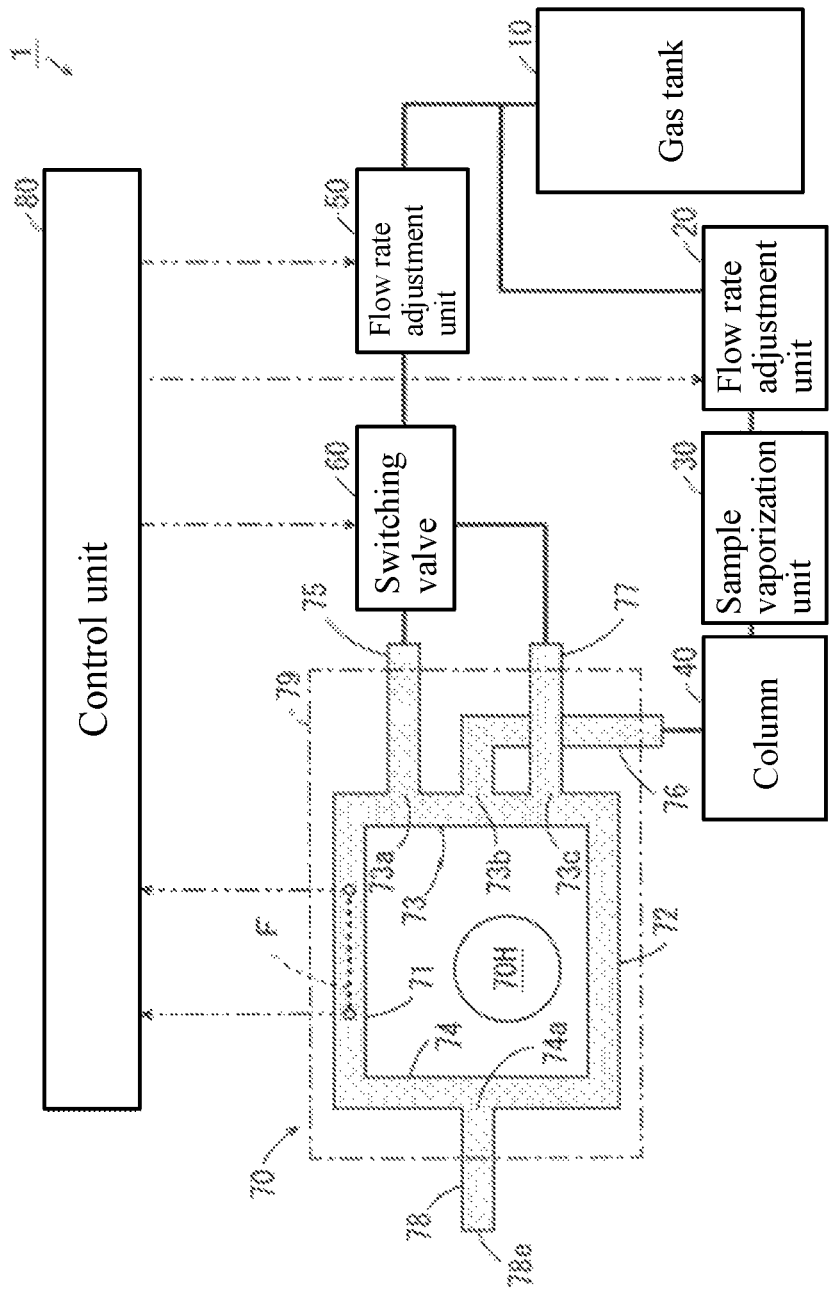
FIG. 1 is a block diagram showing a configuration of a gas chromatograph according to a first embodiment.

[1] First Embodiment (1) Schematic Configuration of Gas Chromatograph and Basic Operation FIG. 1 is a block diagram showing a configuration of a gas chromatograph according to a first embodiment. As shown in FIG. 1, the gas chromatograph 1 according to this embodiment is provided with, as main constituent elements, a gas tank 10, a flow rate adjustment unit 20, a sample vaporization unit 30, a column 40, a flow rate adjustment unit 50, a switching valve 60, a thermal conductivity detector 70, and a control unit 80.

In the gas tank 10, a carrier gas for guiding a sample gas which will be described later to the column 40 and the thermal conductivity detector 70 is stored. As the carrier gas, an inert gas, such as, e.g., a helium gas, is used, for example.

The gas tank 10 supplies a carrier gas to two flow rate adjustment units 20 and 50 through a branch pipe passage. One of the flow rate adjustment units 20 supplies the carrier gas at a predetermined flow rate to the sample vaporization unit 30 based on the control of the control unit 80.

The sample vaporization unit 30 includes an injector and a vaporization chamber. The sample is injected into the vaporization chamber of the sample vaporization unit 30 via the injector. The internal atmosphere of the vaporization chamber is maintained in a state in which the sample is vaporized. Thereby, the sample injected into the vaporization chamber is vaporized inside thereof. The sample vaporization unit 30 supplies the vaporized sample to the column 40 while mixing with the carrier gas supplied from the flow rate adjustment unit 20. In the following description, a gas containing components of the sample vaporized in the sample vaporization unit 30 is collectively referred to as a sample gas.

The column 40 is housed in a column oven which is not illustrated. In the column 40, components of the sample gas supplied from the sample vaporization unit 30 will be separated. The column 40 supplies the sample gas separated for each component to a sample introduction pipe passage 76 (which will be described later) of the thermal conductivity detector 70.

[34] The other flow rate adjustment unit 50 supplies the carrier gas at a predetermined flow rate to a switching valve 60 based on the control of the control unit 80. The switching valve 60 is, for example, a three-way electromagnetic valve, and is connected to the flow rate adjustment unit 50 and also connected to two carrier gas introduction pipe passages 75 and 77 (which will be described later) of the thermal conductivity detector 70. The switching valve 60 supplies the carrier gas to be supplied from the flow rate adjustment unit 50 to either one of the carrier gas introduction pipe passages 75 and 77 based on the control of the control unit 80.

Further, as a configuration for supplying the carrier gas passing through the flow rate adjustment unit 50 to either one of the two carrier gas introduction pipe passages 75 and 77, in place of the switching valve 60, a switching mechanism including multiple control valves and a branch pipe passage may be used. For example, a main pipe passage is connected to the flow rate adjustment unit 50, and two secondary pipe passages are connected to the carrier gas introduction pipe passages 75 and 77, respectively. Further, two control valves are provided to each of the two secondary pipe passages. In this case, by controlling the open/close state of the two control valves, the carrier gas supplied from the flow rate adjustment unit 50 can be selectively supplied to one of the two carrier gas introduction pipe passages 75 and 77 of the thermal conductivity detector 70.

The thermal conductivity detector 70 according to this embodiment includes a first pipe passage 71, a second pipe passage 72, a third pipe passage 73, a fourth pipe passage 74, carrier gas introduction pipe passages 75, 77, a sample introduction pipe passage 76, and an exhaust pipe passage 78 respectively extending linearly. The plurality of pipe passages is each formed by, for example, a metal pipe passage. Further, among the plurality of pipe passages of the thermal conductivity detector 70, the first to fourth pipe passages 71 to 74 are accommodated in a cell block 79 together with a heating device 70H. The cell block 79 is produced by processing and joining a plurality of metal plate-like members.

The first pipe passage 71 and the second pipe passage 72 are formed so as to face and extend in parallel with each other. The third pipe passage 73 is formed so as to connect one end of the first pipe passage 71 and one end of the second pipe passage 72, and the fourth pipe passage 74 is formed so as to connect the other end of the first pipe passage 71 and the other end of the second pipe passage 72. In the first pipe passage 71, a filament F is accommodated. On the other hand, no filament F is accommodated in the second pipe passage 72.

In the third pipe passage 73, a first gas introduction part 73a, a second gas introduction part 73b, and a third gas introduction part 73c are provided in this order. Of the first to third gas introduction parts 73a to 73c, the first gas introduction part 73a is closest to the first pipe passage 71, and the third gas introduction part 73c is closest to the second pipe passage 72.

The carrier gas introduction pipe passage 75 is formed so as to extend from the first gas introduction part 73a to the outside of the cell block 79. The sample introduction pipe passage 76 is formed so as to extend from the second gas introduction part 73b to the outside of the cell block 79. The carrier gas introduction pipe passage 77 is formed so as to extend from the third gas introduction part 73c to the outside of the cell block 79.

In the fourth pipe passage 74, a gas discharge part 74a is provided. The exhaust pipe passage 78 is formed so as to extend from the gas discharge part 74a to the outside of the cell block 79. A through-hole is formed in the gas discharge part 74a. Thereby, the inner space of the fourth pipe passage 74 and the inner space of the exhaust pipe passage 78 communicate with each other. The exhaust pipe passage 78 has an outlet port 78e outside the cell block 79.

The heating device 70H is controlled by the control unit 80, and maintains the space in the cell block 79 at a temperature similar to the temperature in the vaporization chamber of the sample vaporization unit 30 or the temperature in the column oven accommodating the column 40. As the heating device 70H, for example, a cartridge heater is used.

The control unit 80 is configured by, for example, a CPU (Central Processing Unit) and a memory, or a microcomputer, and controls the operation of each constituent element of the gas chromatograph 1 as described above. In addition, the control unit 80 of this example further includes a drive circuit for driving the filament F and a detection circuit for detecting a change in the resistance of the filament F.

The above-described switching valve 60 is switched in a predetermined period (for example, about 100 msec) between a first state for supplying the carrier gas to one carrier gas introduction pipe passage 75 and a second state for supplying the carrier gas to the other carrier gas introduction pipe passage 77.

In this case, in the third pipe passage 73 of the thermal conductivity detector 70, when the switching valve 60 is in the first state, the pressure in the space on the first gas introduction part 73a side is higher than that of the second gas introduction part 73b side. Thereby, the sample gas supplied to the sample introduction pipe passage 76 flows through the second pipe passage 72 together with a part of the carrier gas introduced from the first gas introduction part 73a. Further, the rest of the carrier gas introduced from the first gas introduction part 73a flows through the first pipe passage 71 as a reference gas.

On the other hand, in the third pipe passage 73 of the thermal conductivity detector 70, when the switching valve 60 is in the second state, the pressure in the space on the third gas introduction part 73c side is higher than that of the second gas introduction part 73b side. Thereby, the sample gas supplied to the sample introduction pipe passage 76 flows through the first pipe passage 71 together with a part of the carrier gas introduced from the third gas introduction part 73c. Also, the rest of the carrier gas introduced from the third gas introduction part 73c flows through the second pipe passage 72.

Thus, in the control unit 80, based on the change in the resistance value of the filament F between when the reference gas passes around the filament F and when the sample gas passes around the filament F, the thermal conductivity of the sample gas is measured.

(2) Cleanable Structure of Thermal Conductivity Detector 70

As described above, in the thermal conductivity detector 70, the space in the cell block 79 is maintained approximately at the same temperature as the vaporization temperature of the sample by the heating device 70H. On the other hand, most of the exhaust pipe passage 78 drawn out of the inside of the cell block 79 to the outside is exposed to the air at normal temperature (for example, about 25° C.). With this, there is a possibility that clogging of the exhaust pipe passage 78 may occur due to the condensation or coagulation and adhesion of the sample gas to the inner surface of the exhaust pipe passage 78. In order to remove the adhered substance in the exhaust pipe passage 78, it is necessary to clean the exhaust pipe passage 78 using a cleaning fluid capable of dissolving the adhered substance.

The inventor confirmed that clogging of the exhaust pipe passage 78 could be removed by cleaning the exhaust pipe passage 78 using an organic solvent, such as, e.g., dichloromethane, as the cleaning fluid when clogging occurred in the exhaust pipe passage 78 when an amine based sample is analyzed.

Each pipe passage constituting the thermal conductivity detector 70 is made of, for example, stainless steel. Also, the filament F is made of, for example, tungsten. These metal materials are likely to be corroded by a cleaning fluid used to clean the exhaust pipe passage 78.

Therefore, in the thermal conductivity detector 70, as shown by the dot pattern in FIG. 1, on the entire inner surface of each pipe passage that constitutes the thermal conductivity detector 70, a first coating having resistance to a cleaning fluid for removing an adhered substance resulting from a sample gas is formed. The first coating has higher resistance to the cleaning fluid than the material forming each pipe passage of the thermal conductivity detector 70. In addition, a second coating having resistance to the cleaning fluid for removing the adhered substance caused by the sample gas is formed on the filament F accommodated in the first pipe passage 71. The second coating has higher resistance to the cleaning fluid than the material forming the filament F. Furthermore, the thermal conductivity detector 70 is configured to be removable from the other constituent elements in the gas chromatograph 1.

The above-described first and second coatings may be formed by the same material, or may be formed by different materials. Regarding the cleaning of the thermal conductivity detector 70, as a highly versatile material that can be used for the first and second coatings, for example, glass, silicon carbide or diamond like carbon can be exemplified. The thickness of each of the first and second coatings is 100 μm or less. The formation of each of the first and second coatings is performed using a surface treatment technique (such as, e.g., chemical vapor deposition and physical vapor deposition) according to the materials of the first and second coatings and the material and shape of the object on which the first and second coating are formed.

(3) Effects

In the above thermal conductivity detector 70, when clogging occurred in the exhaust pipe passage 78, the user can supply a cleaning fluid to the exhaust pipe passage 78. In this case, the adhered substance in the exhaust pipe passage 78 is dissolved by the cleaning fluid and removed from the exhaust pipe passage 78.

At this time, since the first coating is formed on the inner surface of each pipe passage of the thermal conductivity detector 70 and the second coating is formed on the filament F, corrosion of each pipe passage and the filament F of the thermal conductivity detector 70 is suppressed. Thereby, the thermal conductivity detector 70 after cleaning can be reused. Therefore, the replacement of the thermal conductivity detector 70 in the gas chromatograph 1 becomes unnecessary, which enables reduction of the running cost of the gas chromatograph 1.

Further, according to the above-described configuration, the first coating is formed on the entire inner surface of each pipe passage of the thermal conductivity detector 70, and the second coating is formed on the filament F. As a result, the cleaning fluid can be made to flow through the entirety of each pipe passage of the thermal conductivity detector 70, so the cleaning is easy. Furthermore, since the entire inner surface of each pipe passage is protected by the first coating and the filament F is protected by the second coating, the life extension of the thermal conductivity detector 70 can be realized.

[2] Second Embodiment

Figure 2:
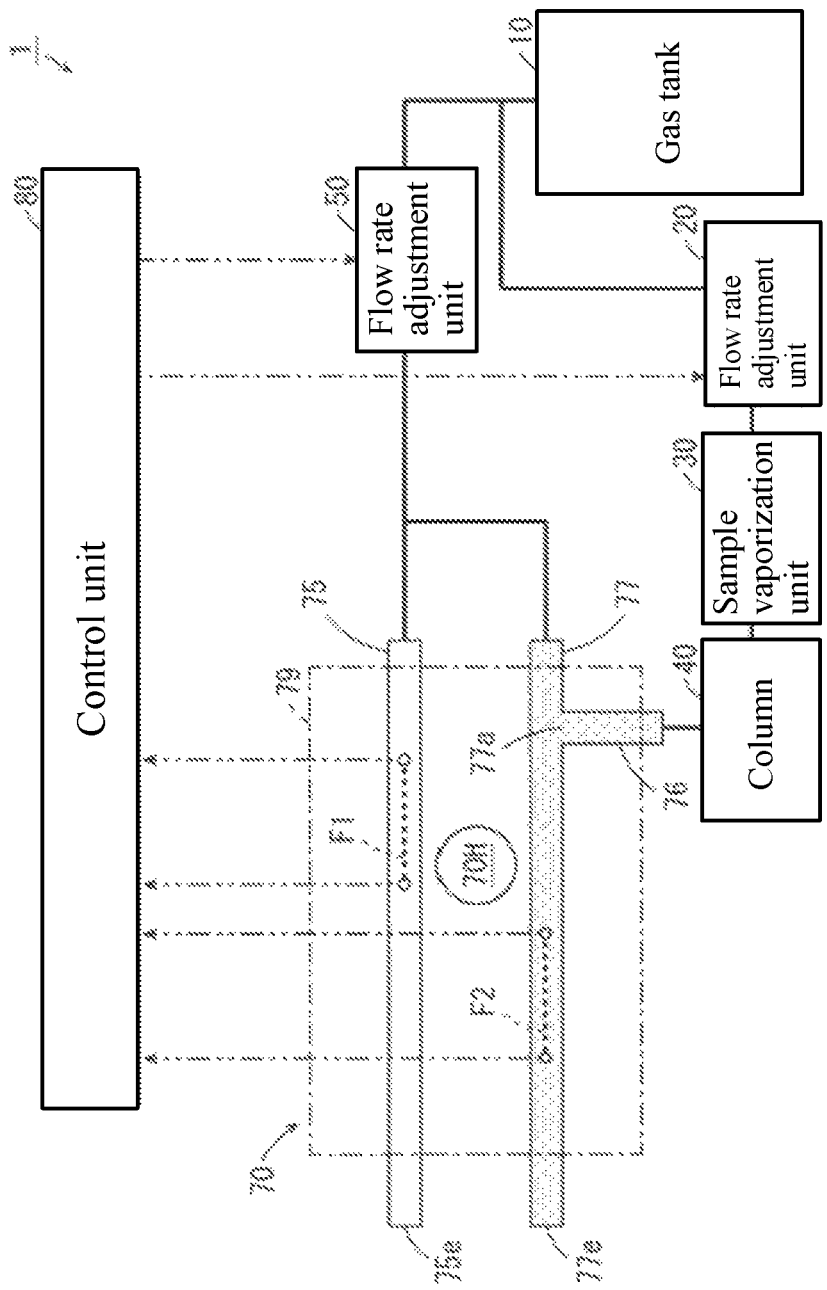
FIG. 2 is a block diagram showing a configuration of a gas chromatograph according to a second embodiment.

FIG. 2 is a block diagram showing a configuration of a gas chromatograph according to a second embodiment. Regarding the gas chromatograph 1 according to the second embodiment, points different from the gas chromatograph 1 according to the first embodiment will be described.

As shown in FIG. 2, the thermal conductivity detector 70 of the gas chromatograph 1 according to this embodiment is basically configured by two carrier gas introduction pipe passages 75 and 77, a sample introduction pipe passage 76, two filaments F1 and F2, and a cell block 79.

The carrier gas introduction pipe passages 75 and 77 are provided so as to penetrate the cell block 79. Both ends of each carrier gas introduction pipe passages 75, 77 are drawn out of the cell block 79. The carrier gas introduction pipe passage 75 has an outlet port 75e at one of its ends. The carrier gas introduction pipe passage 77 has an outlet port 77e at one of its ends.

A filament F1 is accommodated inside the cell block 79 and inside one carrier gas introduction pipe passage 75, and a filament F2 is accommodated inside the cell block 79 and inside the other carrier gas introduction pipe passage 77.

A flow rate adjustment unit 50 is connected to two carrier gas introduction pipe passages 75 and 77 via a branch pipe passage. As a result, in the thermal conductivity detector 70, a carrier gas is supplied from the flow rate adjustment unit 50 to the carrier gas introduction pipe passages 75 and 77.

A gas introduction part 77a is provided at a position on the upstream side of the filament F2 in the carrier gas introduction pipe passage 77. The sample introduction pipe passage 76 is formed so as to extend from the gas introduction part 77a to the outside of the cell block 79. A through-hole is formed in the gas introduction part 77a. As a result, the inner space of the carrier gas introduction pipe passage 77 and the inner space of the sample introduction pipe passage 76 communicate with each other.

In this gas chromatograph 1, the sample gas is supplied from the column 40 to the sample introduction pipe passage 76 in a state in which the carrier gas is supplied from the flow rate adjustment unit 50 to the carrier gas introduction pipe passages 75 and 77, respectively. Thus, in the carrier gas introduction pipe passage 75, the carrier gas passes around the filament F1 as a reference gas. On the other hand, in the carrier gas introduction pipe passage 77, the sample gas supplied from the sample introduction pipe passage 76 passes around the filament F2 together with the carrier gas.

With this, in the control unit 80, based on the resistance value of the filament F1 when the reference gas passes around the filament F1 and the resistance value of the filament F2 when the sample gas passes around the filament F2, the thermal conductivity of the sample gas is measured.

Here, in this embodiment, the sample gas is not supplied to the carrier gas introduction pipe passage 75 in the thermal conductivity detector 70. Therefore, clogging due to the sample gas does not occur inside the carrier gas introduction pipe passage 75. For this reason, the first coating described in the first embodiment is not formed on the inner surface of the carrier gas introduction pipe passage 75. Also note that the second coating described in the first embodiment is not formed on the filament F1.

On the other hand, as described above, the sample gas is supplied to the carrier gas introduction pipe passage 77. In this case, the downstream end of the carrier gas introduction pipe passage 77 including the outlet port 77e and the vicinity thereof are drawn out of the cell block 79, so the carrier gas introduction pipe passage 77 may cause clogging due to the sample gas.

Therefore, in this embodiment, as shown by the dot pattern in FIG. 2, a first coating having resistance to a cleaning fluid for removing the adhered substance resulting from the sample gas is formed on the entire inner surfaces of the carrier gas introduction pipe passage 77 and the sample introduction pipe passage 76. The first coating has higher resistance to the cleaning fluid than the material forming the carrier gas introduction pipe passage 77 and the sample introduction pipe passage 76. In addition, on the filament F2, a second coating having resistance to the cleaning fluid for removing the adhered substance caused by the sample gas is formed. The second coating has higher resistance to the cleaning fluid than the material forming the filament F2. Furthermore, the thermal conductivity detector 70 is configured to be removable from the other constituent elements in the gas chromatograph 1.

With such a configuration, when clogging occurred in the carrier gas introduction pipe passage 77, the user can supplies a cleaning fluid to the carrier gas introduction pipe passage 77 and the sample introduction pipe passage 76. In this case, the adhered substance clogged inside the outlet port 77e of the carrier gas introduction pipe passage 77 and the vicinity thereof is dissolved by the cleaning fluid and removed from the carrier gas introduction pipe passage 77.

[3] Third Embodiment

Figure 3:
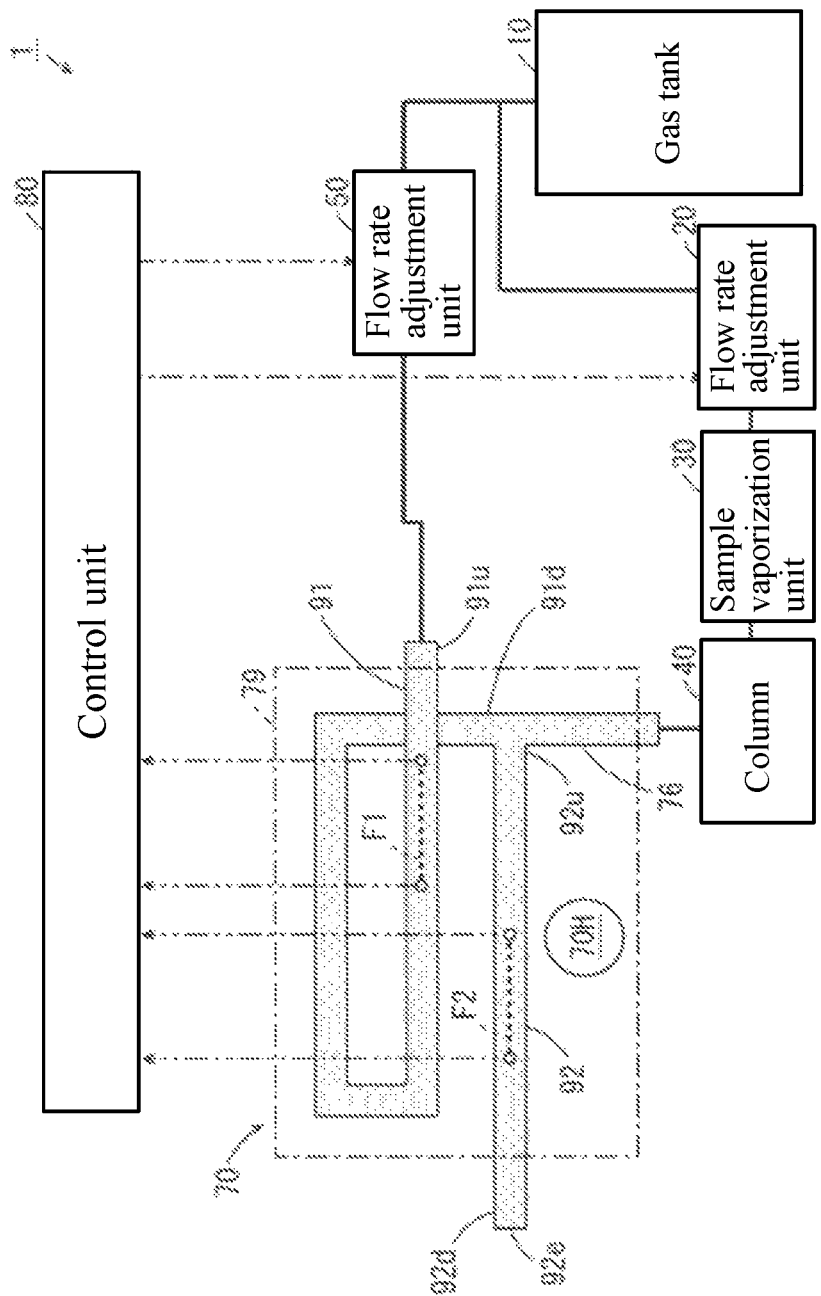
FIG. 3 is a block diagram showing a configuration of a gas chromatograph according to a third embodiment.

FIG. 3 is a block diagram showing a configuration of a gas chromatograph according to a third embodiment. Regarding the gas chromatograph 1 according to the third embodiment, points different from the gas chromatograph 1 according to the first embodiment will be described.

As shown in FIG. 3, the thermal conductivity detector 70 of the gas chromatograph 1 according to this embodiment is composed of, as main constituent elements, a sample introduction pipe passage 76, a carrier gas introduction pipe passage 91, a gas flow pipe passage 92, two filaments F1 and F2, and a cell block 79.

[69] The carrier gas introduction pipe passage 91 has an upstream end 91u and a downstream end 91d, and the gas flow pipe passage 92 has an upstream end 92u and a downstream end 92d. The gas flow pipe passage 92 has an outlet port 92e at its downstream end 92d.

The carrier gas introduction pipe passage 91 is accommodated in the cell block 79 with the upstream end 91u drawn out of the cell block 79. In the gas flow pipe passage 92, the downstream end 92d is drawn out of the cell block 79, and the other part is accommodated in the cell block 79. To the upstream end 92u of the gas flow pipe passage 92, the downstream end 91d of the carrier gas introduction pipe passage 91 is connected and one end of the sample introduction pipe passage 76 is connected. The other end of the sample introduction pipe passage 76 is drawn out of the cell block 79. The filament F1 is accommodated in the carrier gas introduction pipe passage 91, and the filament F2 is accommodated in the gas flow pipe passage 92. A carrier gas is supplied from the flow rate adjustment unit 50 to the upstream end 91u of the carrier gas introduction pipe passage 91.

In this gas chromatograph 1, the sample gas is supplied from the column 40 to the sample introduction pipe passage 76 in a state in which the carrier gas is supplied from the flow rate adjustment unit 50 to the carrier gas introduction pipe passage 91. Thus, in the carrier gas introduction pipe passage 91, the carrier gas passes around the filament F1 as a reference gas. On the other hand, in the gas flow pipe passage 92, the sample gas supplied from the sample introduction pipe passage 76 passes around the filament F2 together with the carrier gas supplied from the carrier gas introduction pipe passage 91.

With this, in the control unit 80, based on the resistance value of the filament F1 when the reference gas passes around the filament F1 and the resistance value of the filament F2 when the sample gas passes around the filament F2, the thermal conductivity of the sample gas is measured.

[73] Therefore, in this embodiment, as shown by the dot pattern in FIG. 3, a first coating having resistance to a cleaning fluid for removing the adhered substance resulting from the sample gas is formed on the entire inner surfaces of the carrier gas introduction pipe passage 91, the gas flow pipe passage 92, and the sample introduction pipe passage 76. The first coating has higher resistance to the cleaning fluid than the material forming the carrier gas introduction pipe passage 91 and the sample introduction pipe passage 76. Also, in filaments F1 and F2, a second coating having resistance to the cleaning fluid for removing the adhered substance resulting from the sample gas is formed on the filaments F1 and F2. The second coating has higher resistance to the cleaning fluid than the material forming the filaments F1 and F2. Furthermore, the thermal conductivity detector 70 is configured to be removable from the other constituent elements in the gas chromatograph 1.

With such a configuration, when clogging occurred in the gas flow pipe passage 92, the user can supplies a cleaning fluid to the carrier gas introduction pipe passage 91, the gas flow pipe passage 92, and the sample introduction pipe passage 76. In this case, the adhered substance clogged inside the outlet port 92e of the gas flow pipe passage 92 and the vicinity thereof is dissolved by the cleaning fluid and removed from the gas flow pipe passage 92.

[4] Other Embodiments

In the thermal conductivity detector 70 according to the first embodiment, the first coating is formed so as to cover the inner surface of the entire flow path through which the sample gas and the carrier gas flow and the second coating is formed so as to cover the surface of the filament F, but the present invention is not limited to this. It may be configured such that the first coating is formed only on the inner surface of the exhaust pipe passage 78 and the second coating is not formed on the filament F. In this case, the exhaust pipe passage 78 may be provided with fluid related equipment, such as, e.g., a drain pipe and a valve, for allowing the cleaning fluid to flow only to the exhaust pipe passage 78. As a result, only the exhaust pipe passage 78 of the thermal conductivity detector 70 can be cleaned.

Similar to the above example, in the thermal conductivity detector 70 according to the second embodiment, it may be configured such that the first coating is formed only on the inner surface of the downstream end of the carrier gas introduction pipe passage 77 and its vicinity and the second coating is not formed on the filaments F1 and F2. Further, in the thermal conductivity detector 70 according to the third embodiment, it may be configured such that the first coating is formed only on the inner surface of the downstream end 92d of the gas flow pipe passage 92 and the vicinity thereof and the second coating is not formed on the filaments F1 and F2.

In the above embodiments, the filaments F, F1, and F2 are used to detect the thermal conductivity of the sample gas, but other heating elements whose resistance changes according to the thermal conductivity of the sample gas may be used instead of a filament.

[5] Correspondence Relationship Between Each Constituent Element of Claims and Each Part of Embodiments Hereinafter, the example of correspondence of each constituent element of claims and each part of embodiments will be explained, but the present invention is not limited to the following example.

In the first embodiment, the first to fourth pipe passage 71 to 74 in FIG. 1, the carrier gas introduction pipe passage 75, 77, the sample introduction pipe passage 76 and the exhaust pipe passage 78 are examples of the flow path. The first pipe passage 71 in the cell block 79 of FIG. 1 is an example of the first portion. The part of the exhaust pipe passage 78 drawn out of the cell block 79 of FIG. 1 is an example of the second portion.

In the second embodiment, the sample introduction pipe passage 76 and the carrier gas introduction pipe passage 77 in FIG. 2 are examples of the flow path. The carrier gas introduction pipe passage 77 in the cell block 79 of FIG. 2 is an example of the first portion. The portion of the carrier gas introduction pipe passage 77 drawn out of the cell block 79 of FIG. 2 is an example of the second portion.

In the third embodiment, the sample introduction pipe passage 76, the carrier gas introduction pipe passage 91, and the gas flow pipe passage 92 of FIG. 3 are examples of the flow path. The part of the carrier gas introduction pipe passage 91 and the part of the gas flow pipe passage 92 in the cell block 79 of FIG. 3 are examples of the first portion. The part of the gas flow pipe passage 92 drawn out of the cell block 79 of FIG. 3 is an example of the second portion.

In the above embodiment, the filaments F, F1, and F2 are examples of the heating element, and the cell block 79 is an example of the heat retention unit.

As each constituent element of claims, other various elements having the configuration or function recited in claims can also be used.

The invention claimed is:
1. A thermal conductivity detector for a gas chromatograph, comprising:
 a flow path having a first portion and a second portion arranged on a downstream of the first portion, the flow path being configured to guide a sample gas to an outlet port of the second portion via the first portion and the second portion;

a heating element accommodated in the first portion to detect thermal conductivity of the sample gas;

a heating device controllable to maintain a vaporization temperature of the sample gas in the first portion; and a cell block having an inner space that accommodates at least the first portion and the heating device to keep the first portion warm, wherein a first coating having resistance to a cleaning fluid for removing an adhered substance due to the sample gas is formed on an inner surface of the second portion of the flow path.

2. The thermal conductivity detector as recited in claim 1, wherein the first coating is also formed on an inner surface of the first portion.

3. The thermal conductivity detector as recited in claim 1, wherein the first coating has higher resistance to the cleaning fluid than a material forming the flow path.

4. The thermal conductivity detector as recited in claim 1, wherein the heating element is provided with a second coating having resistance to the cleaning fluid.

5. The thermal conductivity detector as recited in claim 4, wherein the second coating has higher resistance to the cleaning fluid than a material forming the heating element.

6. A gas chromatograph comprising:

a sample vaporization unit configured to generate a sample gas by vaporizing a sample;

a column configured to separate components of the sample gas generated by the sample vaporization unit; and the thermal conductivity detector as recited in claim 1, wherein the thermal conductivity detector detects thermal conductivity of the sample gas of each component separated by the column.

7. The thermal conductivity detector as recited in claim 1, wherein the heating device is a cartridge heater.

* * * * *